(12) United States Patent
Champagne et al.

(10) Patent No.: US 9,187,119 B2
(45) Date of Patent: Nov. 17, 2015

(54) WHEEL SPEED VELOCITY VARIATION SCALING SYSTEM

(75) Inventors: Anthony J. Champagne, Saginaw, MI (US); Michael K. Hales, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 127 days.

(21) Appl. No.: 13/535,577

(22) Filed: Jun. 28, 2012

(65) Prior Publication Data

US 2013/0158805 A1 Jun. 20, 2013

Related U.S. Application Data

(60) Provisional application No. 61/570,628, filed on Dec. 14, 2011.

(51) Int. Cl.
*A01B 69/00* (2006.01)
*B62D 11/00* (2006.01)
*B63G 8/20* (2006.01)
*B62D 5/04* (2006.01)

(52) U.S. Cl.
CPC .................................. *B62D 5/0472* (2013.01)

(58) Field of Classification Search
USPC ........................................... 701/1, 41–44, 48
See application file for complete search history.

(56) References Cited

U.S. PATENT DOCUMENTS

| 2003/0182025 A1 | 9/2003 | Tseng et al. |
| 2005/0263338 A1 | 12/2005 | Turner et al. |
| 2009/0125186 A1 | 5/2009 | Recker et al. |

FOREIGN PATENT DOCUMENTS

| CN | 1907786 A | 2/2007 |
| CN | 101289096 A | 10/2008 |

OTHER PUBLICATIONS

Chinese Office Action issued Dec. 3, 2014, in corresponding Chinese Application No. 201210597630.

*Primary Examiner* — Bhavesh V Amin
(74) *Attorney, Agent, or Firm* — CANTOR COLBURN LLP

(57) ABSTRACT

A control system for a power steering system is provided. The control system includes a scaling module for calculating a scale factor based on a wheel frequency. The control system also includes a command module that evaluates a wheel disturbance based on a wheel speed and that determines a wheel disturbance cancel amount based on the wheel speed. The command module generates an assist command to the power steering system based on the wheel disturbance cancel amount and the scale factor.

17 Claims, 5 Drawing Sheets

WHEEL SPEED VELOCITY VARIATION SCALING SYSTEM

CROSS-REFERENCES TO RELATED APPLICATIONS

This patent application claims priority to U.S. Provisional Patent Application Ser. No. 61/570,628 filed Dec. 14, 2011 which is hereby incorporated herein by reference in its entirety.

BACKGROUND OF THE INVENTION

The present invention relates to methods and systems of a steering system, and more particularly to methods and system for rejecting road wheel disturbance in a steering system using wheel velocity.

Vehicles are subjected to some degree of disturbance in the front road wheels. Wheel imbalance is an example of road wheel disturbance. The road wheel disturbance may cause vibrations in the handwheel that may be detectable by a driver. These types of vibrations are directly related to the road wheel rotational mean velocity. The severity of the vibration at the handwheel depends on the both the magnitude of the disturbance and the chassis and steering design. In a typical scenario, the vehicle driver will eventually take the vehicle in for service, to get, for example, the wheels balanced. Several approaches currently exist to reduce handwheel vibrations, however these approaches have drawbacks.

SUMMARY OF THE INVENTION

According to one aspect of the invention, a control system for a power steering system is provided. The control system includes a scaling module for calculating a scale factor based on a wheel frequency. The control system also includes a command module that evaluates a wheel disturbance based on a wheel speed and that determines a wheel disturbance cancel amount based on the wheel speed. The command module generates an assist command to the power steering system based on the wheel disturbance cancel amount and the scale factor.

According to another aspect of the invention, a control system for a power steering system is provided. The control system includes a frequency estimation module for calculating a wheel frequency based on a wheel speed. The control system includes a scaling module for calculating a scale factor based on the wheel frequency. The control system also includes a command module that evaluates a wheel disturbance based on a wheel speed and that determines a wheel disturbance cancel amount based on the wheel speed. The command module generates an assist command to the power steering system based on the wheel disturbance cancel amount and the scale factor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
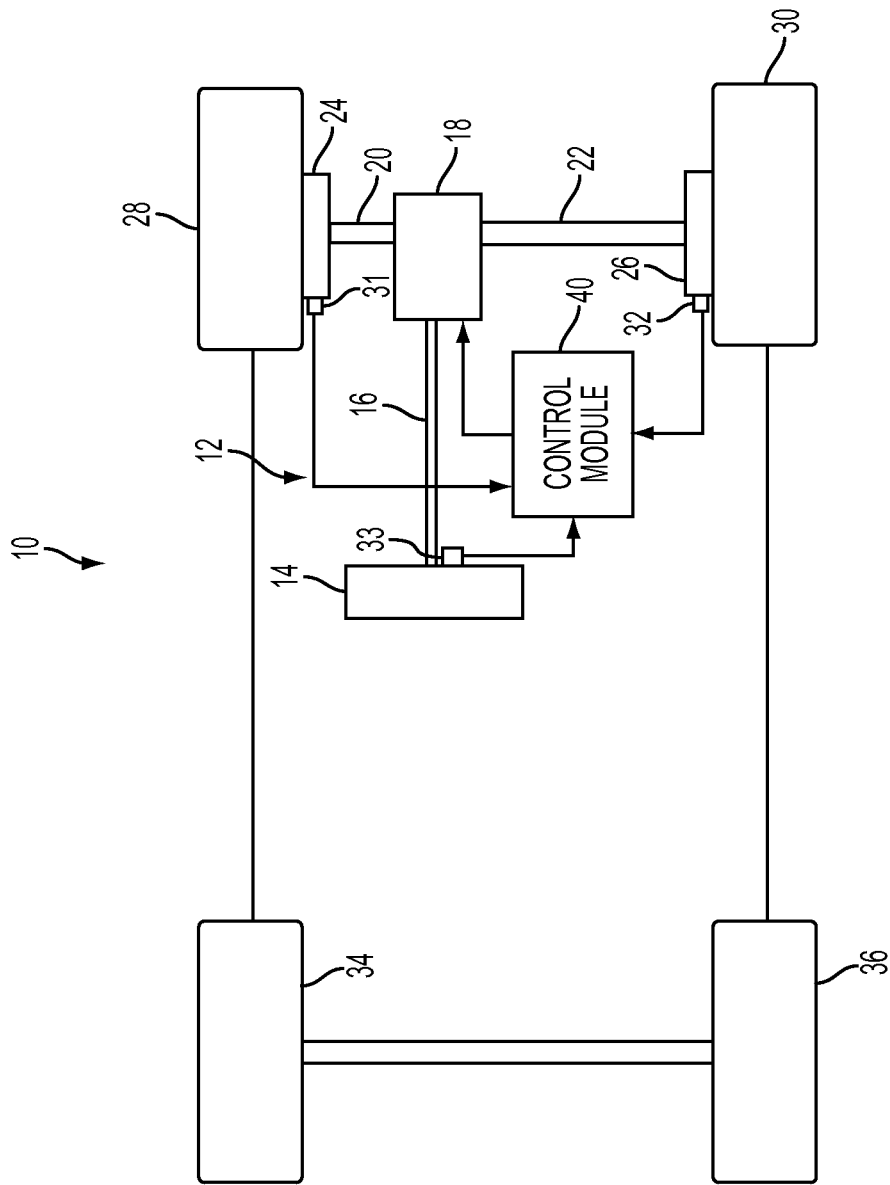
FIG. 1 is a functional block diagram illustrating a vehicle including an electric power steering control system in accordance with an exemplary embodiment of the invention.

Referring now to FIG. 1, where the invention will be described with reference to specific embodiments without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. For exemplary purposes, the disclosure will be discussed in the context of the sensors 31, 32 that are associated with the front wheels 28, 30, respectively. As can be appreciated, other wheel sensors that sense wheel movement, such as wheel position sensors, may be used in place of the wheel speed sensors. In such a case, a wheel velocity may be calculated based on the wheel sensor signal. In another example, the sensor 33 is a torque sensor that senses a torque placed on the handwheel 14. The sensor 33 generates torque signals based thereon.

A control module 40 controls the operation of the steering system 12 based on one or more of the sensor signals and further based on the steering control systems and methods of the present disclosure. Generally speaking, the steering control systems and methods of the present disclosure evaluate the wheel speed signals to determine road wheel disturbance.

In various embodiments, the steering control systems and methods identify a portion of the wheel speed signal that has variation related to wheel disturbance. The steering control system reduces the effects of variations in the wheel speed signals. Specifically, the steering control system scales down variations in the wheel speed signal if the magnitude of the wheel speed signal exceeds a threshold or target value. The steering control system generates a compensation torque command based on the portion of the wheel speed signal that has variation related to wheel disturbance.

Figure 2:
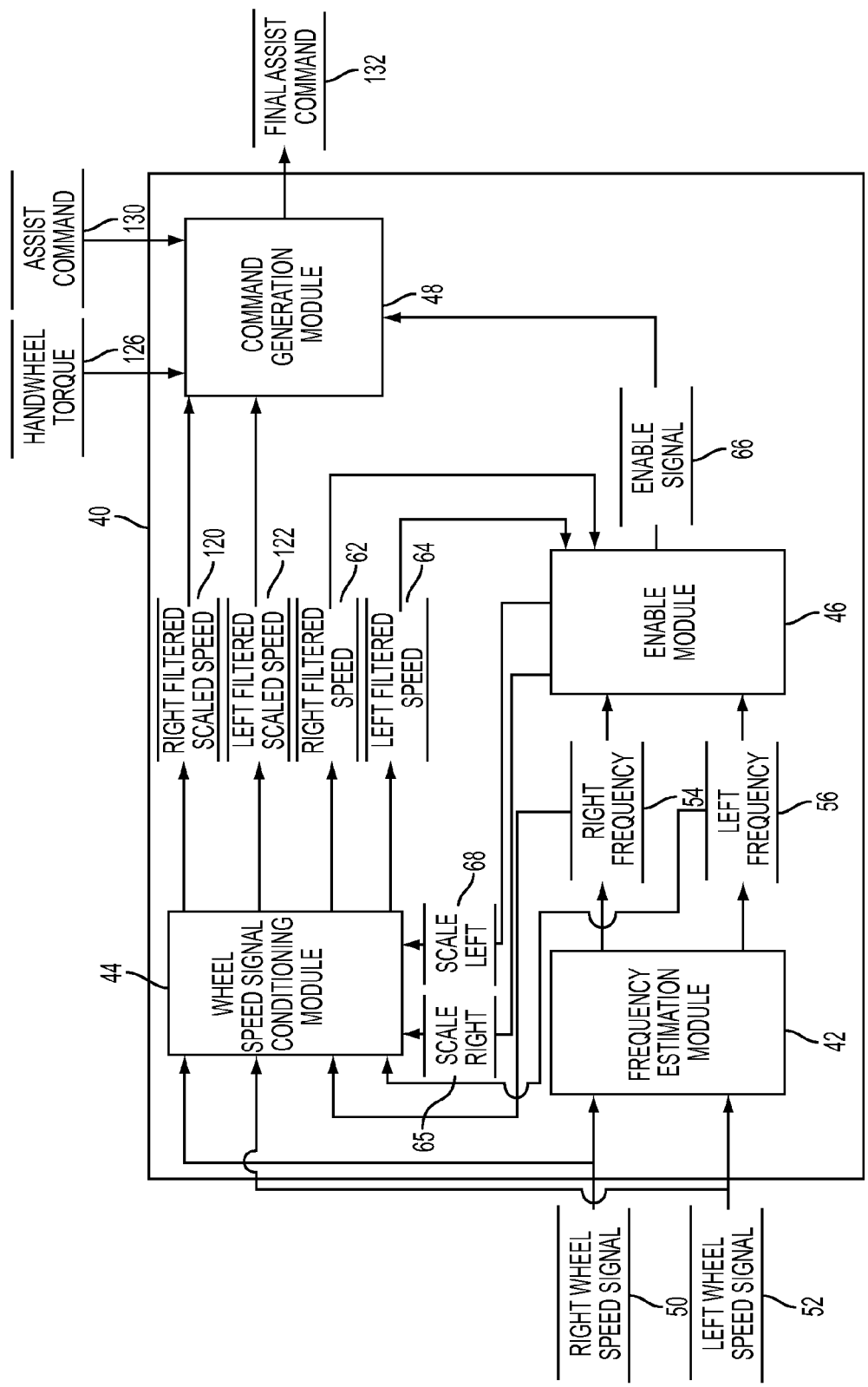
FIG. 2 is a dataflow diagram illustrating the electric power steering control system, in accordance with another exemplary embodiment of the invention.

Referring now to FIG. 2, a dataflow diagram illustrates an exemplary embodiment of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly control road wheel disturbance at the handwheel based on wheel speed signals. Inputs to the control module 40 can be generated from the sensors 31, 32, 33 (FIG. 1) of the vehicle 10 (FIG. 1), can be received from other control modules (not shown) within the vehicle 10 (FIG. 1), can be modeled, and/or can be predefined.

In one example, the control module 40 includes a frequency estimation module 42, a wheel speed signal conditioning module 44, a scaling or enable module 46, and a command generation module 48.

The frequency estimation module 42 receives as input a right wheel speed signal 50 and a left wheel speed signal 52. The frequency estimation module estimates a right frequency 54 and a left frequency 56 for each wheel speed signal 50, 52, respectively. Specifically, the right frequency 54 is based on the right wheel speed signal 50 and the left frequency 56 is based on the left wheel speed frequency 52. For example, in one embodiment the right frequency 54 and the left frequency 56 may be estimated by scaling the wheel speed signals 50, 52 by: frequency=K/(2*π) (i.e., based on the relation: ω=2*π*frequency). In various embodiments, K is a numerical value that represents an order of disturbance (e.g., a first order disturbance or a second order disturbance). Specifically, for example, K is equal to one for a first order disturbance, or two in the case of a second order disturbance. The frequency estimation module 42 may then apply a lowpass filter or other noise reduction filter (not shown) to the scaled wheel speed signals to provide the right frequency 54 and the left frequency 56.

The wheel speed signal conditioning module 44 receives as input the right wheel speed signal 50, the left wheel speed signal 52, the right frequency 54, and the left frequency 56. The wheel speed signal conditioning module 44 pre-conditions the right wheel speed signal 50 and the left wheel speed signal 52 to generate a right filtered speed 62 and a left filtered speed 64 using the right frequency 54 and the left frequency 56. As can be appreciated, various filtering techniques may be used to perform the conditioning. In various embodiments, a bandpass filter may be applied with a specified center frequency.

The enable module 46 receives as input the right frequency 54, the left frequency 56, the right filtered speed 62, and the left filtered speed 64. The enable module 46 enables the assist determination based on the right frequency 54 and the left frequency 56 by generating an enable signal 66. For example, the enable module 46 determines an average of the right frequency 54 and the left frequency 56. The enable module 46 then sets the enable signal 66 as a function of the average. For example, a lookup table (not shown) may be used to output the enable signal 66 based on the average of the right frequency 54 and the left frequency 56.

Figure 3:
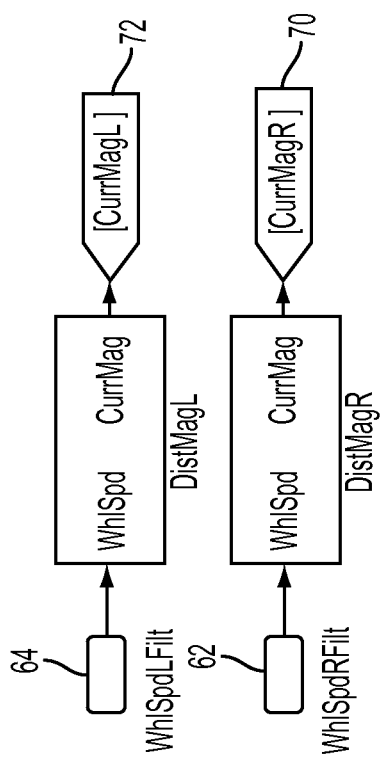
FIG. 3 illustrates an exemplary approach for calculating a left and right magnitude, in accordance with another exemplary embodiment of the invention.
Figure 4:
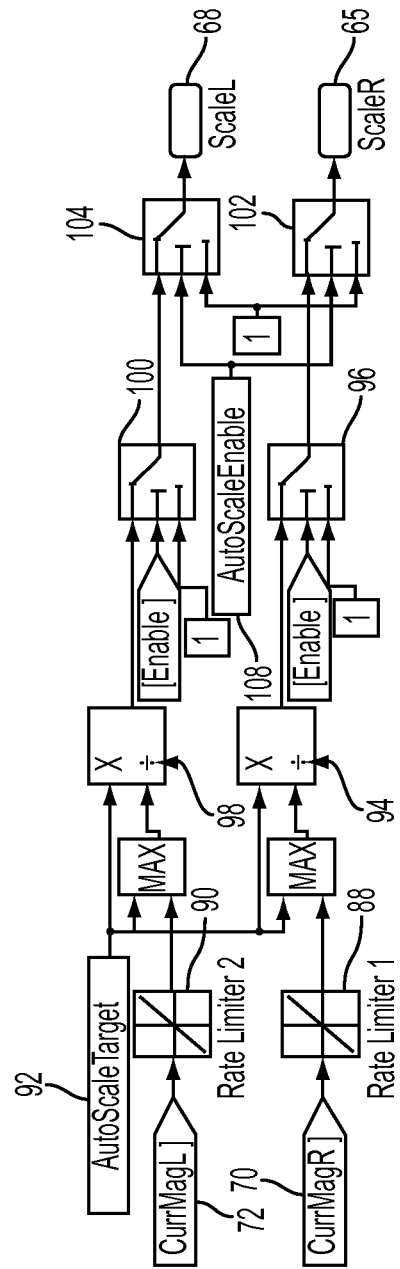
FIG. 4 illustrates an exemplary approach for calculating a left scaled value and a right scaled value, in accordance with yet another exemplary embodiment of the invention.
Figure 5:
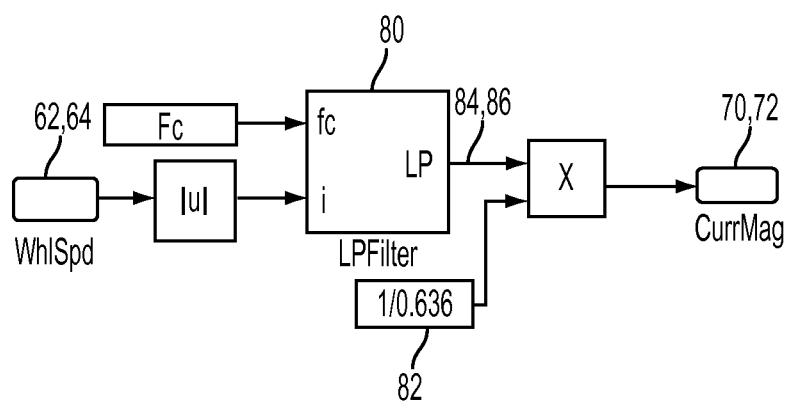
FIG. 5 illustrates another an exemplary approach for calculating a left scaled value and a right scaled value, in accordance with another exemplary embodiment of the invention.

The enable module 46 also generates a right scaled value 65 and a left scaled value 68. With reference to FIGS. 3-5, one approach for calculating the right scaled value 65 and the left scaled value 68 is shown. FIG. 3 illustrates an approach for calculating a right current magnitude 70 and a left current magnitude 72. Specifically, the right current magnitude 70 is based on the right filtered speed 62, and the left current magnitude 72 is based on the left filtered speed 64. The right current magnitude 70 and the left current magnitude 72 represent a magnitude of oscillation in the right filtered speed 62 and the left filtered speed 64 respectively. Referring to FIG. 5, in one embodiment the right current magnitude 70 and the left current magnitude 72 may be calculated using the approach of calculating an absolute value of both the right filtered speed 62 and a left filtered speed 64. A low pass filter 80 may then be applied to the absolute values of the right filtered speed 62 and the left filtered speed 64. A scale factor 82 may be applied to a filtered value 84 of the right filtered speed 62 and a filtered value 86 of the left filtered speed 64. In one example, the scale factor 82 may be about 1/0.636, however it is understood that other values for the scale factor 82 may be used as well. The product of the scale factor 82 with either the filtered value 84 or the filtered value 86 creates the right current magnitude 70 and the left current magnitude 72 respectively.

Figure 6:
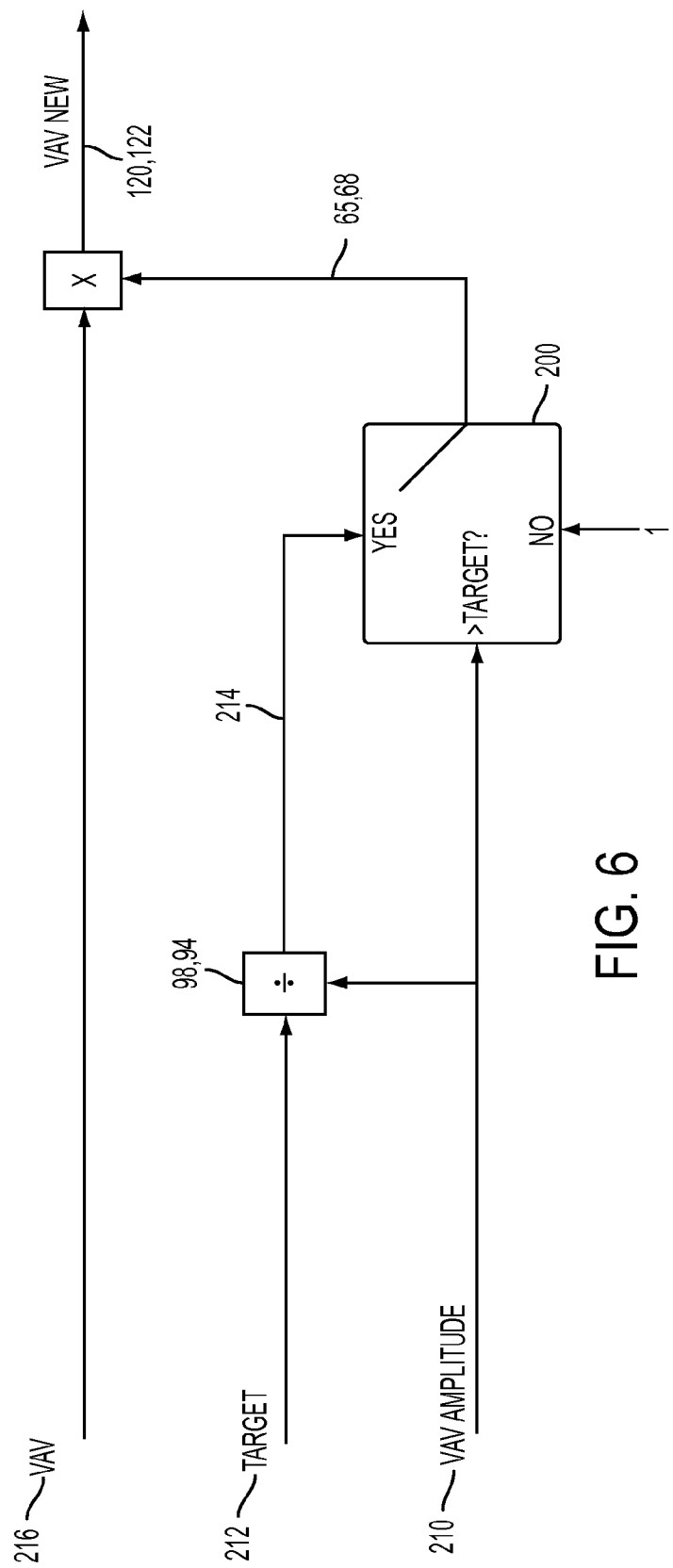
FIG. 6 illustrates an exemplary approach for calculating a left scaled value and a right scaled value in accordance with yet another exemplary embodiment of the invention.

FIGS. 4 and 6 are an exemplary illustration of one approach for calculating the right scaled value 65 and the left scaled value 68. Referring to FIG. 4, the right current magnitude 70 is fed to a right rate limiter 88 and the left current magnitude 72 is fed to a left rate limiter 90. The output from both the right rate limiter 88 and the left rate limiter 90 are compared to an Auto Scale target value 92. The Auto Scale target value 92 represents an allowed variation in the wheel speed signals 50, 52 which may also represent a generally allowed maximum variation. Specifically, the output from the right rate limiter 88 is compared to the Auto Scale target value 92, and the greater of the two values is used a right divisor 94. The Auto Scale target value 92 is divided by the right divisor 94 to produce a right dividend. The right dividend is never greater than 1. The right dividend is then fed to a right switch 96. The output from the left rate limiter 90 is compared to the Auto Scale target value 92, and the greater of the two values is used a left divisor 98 to produce a left dividend. The left dividend is never greater than 1. The dividend is then fed to a left switch 100.

Referring now to the right switch 96 and the left switch 100, in the event that enable signal 66 includes a value that is greater than zero, then the right switch 96 will send the right dividend to a right switch 102 and the left switch 100 sends the left dividend to a left switch 104. An Auto Scale Enable value 108 is used to activate the scaling of the wheel speed signals 50, 52. Specifically, the Auto Scale Enable value 108 either actives scaling by sending a true signal to one or both the right switch 102 and the left switch 104, or deactivates scaling by sending a false signal to one or both the right switch 102 and the left switch 104. In the event that scaling is deactivated, the right switch 102 and the left switch 104 use a value of '1' for the right scaled value 65 and the left scaled value 68.

Referring to FIG. 6, block 200 represents another approach to calculate the right scaled value 65 and the left scaled value 68 and the right scaled filtered speed 120 and the left scaled filtered speed 122. The variation in angular velocity (VAV) amplitude 210 corresponds with either the right current magnitude 70 or the left current magnitude 72 shown in FIG. 4. The Target 212 corresponds with the Auto Scale target value 92 shown in FIG. 4. The Target 212 is divided by the VAV amplitude 210 to determine an intermediate scale value 214 that is sent to block 200 (e.g., the divisor corresponds with either the right divisor 94 or the left divisor 98 shown in FIG. 4). The VAV 216 corresponds with either the right filtered speed 62 or the left filtered speed 64. According to FIG. 6, in the event auto scaling is deactivated (e.g., if the VAV amplitude 216 is not greater than the Target 212) then a value of '1' is used as the right scaled value 65 and the left scaled value 68. In the event the VAV amplitude 216 is above the Target 212, then the VAV 216 is normalized (e.g., the right filtered speed 62 or the left filtered speed 64 is multiplied by either the right scaled value 65 and the left scaled value 68). The normalized VAV 216 results in VAV new 220. The VAV new 220 corresponds to the right scaled filtered speed 120 and the left scaled filtered speed 122 shown in FIG. 2. The approach as shown in FIG. 6 results in reduction of a limit-cycle event, and thus improves a system stability margin.

Referring back to FIG. 2, the enable module 46 sends the right scaled value 65 and the left scaled value 68 to the wheel speed module 44. The wheel speed module 44 calculates a right scaled filtered speed 120 and a left scaled filtered speed 122. Specifically, the right scaled filtered speed 120 is calculated by multiplying the right filtered speed 62 by the right scaled value 65. The left scaled filtered speed 122 is calculated by multiplying the left filtered speed 64 by the left scaled value 68.

The command generation module 48 receives as input the right scaled filtered speed 120, the left scaled filtered speed 122, the enable status 66, a handwheel torque 126, and an assist command 130. As can be appreciated, the assist command 130 may include an assist value that is determined based on other operating conditions of the steering system 12 (FIG. 1).

Based on the inputs, the command generation module 48 generates a final assist command 132 that is used to control the motor of the steering assist unit 18 (FIG. 1). In various embodiments, the command generation module 48 determines a disturbance cancel amount by computing a cancel command for each of the right scaled filtered speed 120 and the left scaled filtered speed 122; summing the cancel commands; and applying a scaling to the sum. The command generation module 48 then applies the cancel command to the assist command 130 and outputs the final assist command 132. In various embodiments, the command generation module 48 computes a cancel command using an adaptive filter method approach. The final assist command 132 is based in part on scaled values for the wheel speed signals 50, 52.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a power steering system, comprising:
    a scaling module for calculating a scale factor based on a wheel frequency; and
    a command module that evaluates a wheel disturbance based on a wheel speed sensed by a wheel speed sensor and determines a wheel disturbance cancel amount based on the wheel speed, the command module further generates an assist command output to control the power steering system, the assist command is based on the wheel disturbance cancel amount and the scale factor, the scaling module further determines the scale factor based on a current magnitude, the current magnitude being based on a filtered wheel speed.

2. The control system as recited in claim 1, comprising a frequency estimation module, wherein the frequency estimation module receives the wheel speed and determines the wheel frequency based on the wheel speed.

3. The control system as recited in claim 2, wherein the wheel frequency is calculated based on the following equation: wheel frequency=$K/(2*\pi)$, wherein K is a numerical value that represents an order of disturbance.

4. The control system as recited in claim 1, wherein the scaling module determines a enable signal that is based on an average value of a left wheel frequency and a right wheel frequency.

5. The control system as recited in claim 1, wherein the current magnitude is determined by calculating an absolute value of the filtered wheel speed, applying a low pass filter to the absolute value of the filtered wheel speed, and multiplying the absolute value of the filtered wheel speed by a scale factor.

6. A control system for a power steering system, comprising:
    a scaling module for calculating a scale factor based on a wheel frequency; and
    a command module that evaluates a wheel disturbance based on a wheel speed sensed by a wheel sensor and determines a wheel disturbance cancel amount based on the wheel speed, the command module further generates an assist command output to control the power steering system, the assist command is based on the wheel disturbance cancel amount and the scale factor and wherein the scaling module further determines the scale factor based on a current magnitude, wherein the current magnitude is based on a filtered wheel speed, the current magnitude being sent to a rate limiter and compared to an auto scale target value, wherein the auto scale target value represents a maximum allowed variation in the wheel speed.

7. The control system as recited in claim 6, wherein an output from the rate limiter is compared to the auto scale target value, and the greater of the output from the rate limiter and the auto scale target value is used as a divisor, wherein the wheel sensor is a wheel speed sensor.

8. The control system as recited in claim 7, wherein the auto scale target value is divided by the divisor to determine a dividend, and wherein if an enable signal determined by the scaling module is greater than zero, then the dividend value is sent to a switch.

9. The control system as recited in claim 8, wherein an auto scale enable value is used to activate scaling of the wheel speed, wherein the auto scale enable value is sent to the switch.

10. The control system as recited in claim 1, comprising a wheel speed conditioning module that receives the wheel speed and the wheel frequency, and generates a filtered speed based on the wheel frequency.

11. A control system for a power steering system, comprising:
a scaling module for calculating a scale factor based on a wheel frequency; and
a command module that evaluates a wheel disturbance based on a wheel speed sensed by a wheel speed sensor and determines a wheel disturbance cancel amount based on the wheel speed, the command module further generates an assist command output to control the power steering system, the assist command is based on the wheel disturbance cancel amount and the scale factor, the scale factor being based on an angular velocity (VAV) amplitude and an auto scale target value, wherein the auto scale target value is divided by the VAV amplitude, wherein the auto scale target value represents an allowed variation in the wheel speed.

12. The control system as recited in claim 1, wherein the scaling module determines a right scale factor based on a right wheel frequency and a left scale factor based on a left wheel frequency.

13. The control system as recited in claim 1, wherein the assist command is based on a handwheel torque and an assist value.

14. A control system for a power steering system, comprising:
a frequency estimation module for calculating a wheel frequency based on a wheel speed sensed by a wheel speed sensor;
a scaling module for calculating a scale factor based on the wheel frequency;
a command module that evaluates a wheel disturbance based on the wheel speed sensed by the wheel speed sensor and determines a wheel disturbance cancel amount based on the wheel speed, the command module generates an assist command output to control the power steering system, the assist command is based on the wheel disturbance cancel amount and the scale factor, the scaling module determining the scale factor based on a current magnitude, the current magnitude is based on a filtered wheel speed, the current magnitude is sent to a rate limiter and compared to an auto scale target value, the auto scale target value represents an allowed variation in the wheel speed.

15. The control system as recited in claim 14, wherein the wheel frequency is calculated based on the following equation: wheel frequency=$K/(2*\pi)$, wherein K is a numerical value that represents an order of disturbance.

16. The control system as recited in claim 14, wherein the scaling module determines a enable signal that is based on an average value of a left wheel frequency and a right wheel frequency.

17. The control system as recited in claim 14, wherein the current magnitude is determined by calculating an absolute value of the filtered wheel speed, applying a low pass filter to the absolute value of the filtered wheel speed, and multiplying the absolute value of the filtered wheel speed by a scale factor.

* * * * *